United States Patent [19]
Dodd

[11] Patent Number: 6,132,656
[45] Date of Patent: Oct. 17, 2000

[54] CONSOLIDATED CELLULOSIC PRODUCT, APPARATUS AND STEAM INJECTION METHODS OF MAKING THE SAME

[75] Inventor: William R. Dodd, Laurel, Miss.

[73] Assignee: Masonite Corporation, Chicago, Ill.

[21] Appl. No.: 09/154,234

[22] Filed: Sep. 16, 1998

[51] Int. Cl.⁷ ..................................................... B27N 3/20
[52] U.S. Cl. ............................ 264/83; 264/109; 425/406
[58] Field of Search ....................... 264/83, 109; 425/406

[56] References Cited

U.S. PATENT DOCUMENTS

| | | | |
|---|---|---|---|
| 3,130,114 | 4/1964 | Nagy et al. ................................. | 162/13 |
| 3,280,237 | 10/1966 | Corbin et al. ............................ | 264/109 |
| 3,619,450 | 11/1971 | Futo .......................................... | 264/109 |
| 3,686,383 | 8/1972 | Mäkinen .................................. | 264/120 |
| 3,891,738 | 6/1975 | Shen ......................................... | 264/101 |
| 4,162,877 | 7/1979 | Nyberg ...................................... | 425/84 |
| 4,393,019 | 7/1983 | Geimer ...................................... | 264/83 |
| 4,517,147 | 5/1985 | Taylor et al. .............................. | 264/83 |
| 4,605,467 | 8/1986 | Bötger ...................................... | 156/497 |
| 4,850,849 | 7/1989 | Hsu .......................................... | 425/407 |
| 4,895,508 | 1/1990 | Held .......................................... | 425/371 |
| 5,028,286 | 7/1991 | Hsu .......................................... | 156/52.4 |
| 5,063,010 | 11/1991 | Fischer et al. ............................ | 264/109 |
| 5,078,938 | 1/1992 | Munk et al. .............................. | 264/109 |
| 5,134,023 | 7/1992 | Hsu .......................................... | 428/288 |
| 5,158,012 | 10/1992 | Gawlitta et al. .......................... | 100/38 |
| 5,195,428 | 3/1993 | Gawlitta et al. .......................... | 100/73 |
| 5,217,665 | 6/1993 | Lim et al. ................................ | 264/83 |
| 5,367,040 | 11/1994 | Teodorczyk .............................. | 528/137 |
| 5,637,658 | 6/1997 | Teodorczyk .............................. | 525/480 |
| 5,756,599 | 5/1998 | Teodorczyk .............................. | 525/491 |

FOREIGN PATENT DOCUMENTS 2206701  6/1974  France .

OTHER PUBLICATIONS

Walter, K., "Steam Pressing Experience From Operating Plants And Future Possibilities" (G. Siempelkamp GmbH and Co.).

*Primary Examiner*—Mary Lynn Theisen
*Attorney, Agent, or Firm*—Marshall, O'Toole, Gerstein, Murray & Borun

[57] ABSTRACT

Disclosed herein is a cellulosic composite article and steam injection press methods of making the same by combining a resin binder with cellulosic material to form a mixture and, thereafter, forming a mat from the cellulosic material/resin binder mixture and consolidating the mat in a pressing apparatus under heat, steam, and pressure to form the consolidated cellulosic product. A steam injection platen includes elongated openings for injection of steam to the mat through an adjacent steam distribution plate. The steam distribution plate includes slots in fluid communication with the steam injection platen openings and is disposed over the openings in the steam injection platen to achieve homogeneous and complete steam distribution throughout the mat during consolidation. The steam is injected and removed through the same steam injection platen so that an opposed press platen can be textured or deeply contoured to provide a variety of embossed designs in a major surface of the consolidated cellulosic product.

12 Claims, 3 Drawing Sheets

CONSOLIDATED CELLULOSIC PRODUCT, APPARATUS AND STEAM INJECTION METHODS OF MAKING THE SAME

BACKGROUND OF THE INVENTION

1. Field of the Invention

The invention relates generally to the production of consolidated cellulosic products and, more specifically, to the production of a consolidated cellulosic product using a steam injection pressing operation wherein steam is injected and exhausted through a single platen, while achieving excellent steam distribution throughout the cellulosic product being consolidated so that an opposite platen can be textured or embossed.

2. Brief Description of Related Technology

Synthetic resin adhesives, such as phenol-based resins, are widely used as binders in the manufacture of composite articles, such as consolidated cellulosic products (e.g., waferboard, chipboard, oriented strandboard, or fiberboard). Such composites may be formed by various processes and may be formed in a variety of desired shapes and sizes depending on the intended end use of the composites. Generally, however, consolidated cellulosic products are formed by combining a phenolic resin, such as a phenol-formaldehyde resin, with filler material, such as cellulosic fibers or cellulosic particles, and then bonding the filler material together in a press that provides heat and pressure. Various processes are described in U.S. Pat. Nos. 5,367,040 and 5,637,658 and co-pending, commonly-assigned U.S. application Ser. No. 08/888,878 (filed Jul. 7, 1997), now U.S. Pat. No. 5,756,599, the disclosures of which are incorporated herein by reference.

A principal process for making a consolidated cellulosic product is a "dry" process. In a dry process, filler material, such as cellulosic fibers, is generally coated with a resin binder in a gaseous stream, or by mechanical means. For example, the fibers supplied from a fiberizing apparatus (e.g., a pressurized refiner) may be coated with a thermosetting synthetic resin, such as a phenol-formaldehyde resin, in a blowline blending procedure, wherein the resin is blended with the fiber with the aid of air turbulence. Thereafter, the resin-coated fibers from the blowline are subjected to pre-press drying, for example, in a tube-like dryer, and then are randomly formed into a mat by air conveying the fibers onto a support member (e.g., a forming wire). The formed mat, preferably having a moisture content of less than about 10 wt. %, is then pressed under heat and pressure in a press between a pair of heated platens to cure the thermosetting resin and to compress the mat into an integral consolidated structure. The consolidated structure may be embossed on an outer surface by texturing one of the press platens to achieve a desired embossed design in the outer surface of the product during consolidation.

In a wet-dry process, the resin-blended fiber from the blowline is mixed with water as the conveying medium and is formed into a mat as a wet slurry on a support member where water is removed by mechanical means to a moisture content of about 60% or less. The formed mat is then mechanically conveyed through a multideck air dryer in which the moisture content is further reduced to about 10% or less. The mat is then pressed under heat and pressure similar to the above "dry" process.

Steam injection pressing is a consolidation step that can be used, for example, in dry and wet-dry process production of consolidated cellulosic composites. In steam injection pressing, steam is injected through one or both of the press platens by providing perforations, e.g., drill holes, in the platen(s) so that steam flows into, through, and then out of a mat that includes the synthetic resin and the filler material. The steam condenses on surfaces of the filler and heats the mat. The heat transferred by the steam to the mat, as well as the heat transferred from the press platens to the mat, causes the resin to cure. When compared with conventional pressing operations, steam injection pressing may provide a variety of advantages, such as, for example, shorter press time, a more rapid and satisfactory cure of thicker panels, and products having more uniform physical properties.

Steam injection pressing of mats containing conventional phenolic resins, however, often results in a final composite product exhibiting undesirable characteristics, such as poor bond formation and/or starved glue lines. In order to ensure good bond formation, it is desirable to have a uniform dispersion of the phenolic resin throughout the mat. However, because phenolic resins are water soluble, when mats containing such resins are steam pressed, the steam often condenses and solubilizes the resin. The solubilized resin undesirably migrates to regions of the mat such that the resin is no longer uniformly dispersed, resulting in a product having resin-starved regions and poor bond formation in such regions. Poor bond formation also is attributable to the known phenomena of pre-cure (i.e., where the resin cures before the mat has been compressed to its final dimensions as an integral consolidated structure) and moisture retardation (i.e., where water present in the core or interior of the mat prevents the mat temperature from exceeding the evaporation temperature of water, 100° C., thereby retarding the resin cure). Starved glue lines caused by excess penetration of the resin can occur near the surface of the formed product where resin has undesirably been washed from the surface of the mat and has migrated to edges of the mat or to the mat core. The absence of resin near the product's surface-hence, the presence of starved glue lines-causes flaking of the product.

Another problem encountered with steam injection press methods and apparatus used to consolidate cellulosic products is that it is difficult to achieve complete penetration of steam throughout the full volume of cellulosic material being consolidated in order to achieve uniform heating of the cellulosic material. The following patents teach steam injection through one press platen and exhaustion of the steam through the opposite platen in an attempt to achieve complete flow-through of steam through the cellulosic material being pressed: Shen U.S. Pat. No. 3,891,738; Böttger U.S. Pat. Nos. 4,605,467; and Hsu U.S. Pat. No. 4,850,849. Gawlitta, et al. U.S. Pat. Nos. 5,195,428 and 5,158,012 teach steam injection through parallel channels extending transversely to the length of the platens and steam is exhausted from the opposite side of the platens to achieve complete flow-through of steam. Geimer U.S. Pat. No. 4,393,019 and Taylor U.S. Pat. No. 4,517,147 teach apertured press platens both above and below the cellulosic material being pressed.

Nyberg U.S. Pat. No. 4,162,877; Corbin, et al. U.S. Pat. No. 3,280,237 and Munk et al. U.S. Pat. No. 5,078,938 disclose steam injection from only one press platen and include steam distribution means, such as a multiplicity of small circular openings, e.g., 1–5 mm in diameter. The Corbin '237 patent also teaches the use of a sintered metal plate disposed below the openings, in contact with the mat being pressed, for providing a plurality of minute passages for diffusion of superheated steam, leaving a smoother surface of the finished board. Other patents that disclose the use of steam during hot press consolidation are as follows: Hsu U.S. Pat. Nos. 5,028,286 and 5,134,023; Mäkinen U.S.

Pat. No. 3,686,383 discloses in-situ steam formation from moisture within the cellulosic material and discloses a wire mesh for steam escape; Held U.S. Pat. No. 4,895,508 discloses circular or slot-shaped apertures in pressure bands that are mounted on rollers in continuous cellulosic board formation or through vertically disposed bores adjacent the boards in semi-continuous board production; and Futo U.S. Pat. No. 3,619,450.

As disclosed in the above-mentioned Corbin, et al. '237 patent, another problem encountered with distribution of steam through a cellulosic product being hot press consolidated is that steam distribution apertures adjacent the cellulosic product cause fibers to enter the apertures during the pressing operation, resulting in a bumpy (non-smooth) surface that may require a sanding or other machine-smoothing step. Although not mentioned in the Corbin, et al. '237 patent, while a sintered metal plate provides for excellent steam distribution and provides a smooth surface of the consolidated product, sintered plates provide very slow steam flow rates so that the time required to achieve the required board temperature and steam saturation would be commercially prohibitive, or would result in incomplete steam contact of the cellulosic material being consolidated.

Another problem encountered when the steam distribution apertures are large enough for sufficient steam injection, i.e., the 1–5 mm apertures of the Nyberg 4,162,877 patent, is that cellulosic material that is consolidated within the apertures results in extreme difficulty in separating the product from the apertured steam distribution plate. To achieve a steam injection method and apparatus that achieves sufficient steam distribution throughout the cellulosic material in a commercially acceptable time while achieving a sufficiently smooth surface that is easily separated from a steam distribution plate, therefore, is a formidable task. To achieve sufficient stream distribution in a commercially acceptable time while achieving a smooth surface on the major product face adjacent steam inlets, while achieving a textured or embossed opposite major product face, is even more difficult.

In view of the foregoing, it would be desirable to provide a method of making a cellulosic product that overcomes the problems described above. More particularly, it would be desirable to provide a method of making consolidated cellulosic products, using a conventional resin binder, such as a phenolic resin, and a steam injection pressing operation, that retains the advantages and overcomes the disadvantages of prior methods of making cellulosic composites.

SUMMARY OF THE INVENTION

It is an object of the invention to overcome one or more of the problems described above.

In accordance with one important aspect of the present invention, a method and apparatus is provided for hot press consolidation of cellulosic material-containing articles, wherein steam is injected into the cellulosic material during consolidation of the article—in a commercially acceptable period of time while achieving a relatively smooth surface on the major surface of the product that steam is injected into so that the product can be separated easily from a product-contacting steam distribution plate. This important aspect of the present invention is achieved while providing a cellulosic material-containing article that can be embossed or textured during steam injection consolidation; requires little or no back surface sanding or other machining for obtaining sufficient back surface smoothness; has excellent machinability, water-resistance and dimensional stability; has improved resistance to buckling; has reduced resin binder requirements; and provides consolidation in a reduced press cycle time, compared to consolidation without steam injection for products having a specific gravity, for example, of about 0.60 to about 0.90.

Accordingly, the invention provides a cellulosic composite article and methods of making the same. Generally, the method includes the steps of combining a resin binder, such as a phenolic resin, with cellulosic material to form a mixture, forming a mat from the mixture, and consolidating the mat under heat, steam, and pressure in a pressing apparatus to form the article.

Further objects and advantages of the invention may become apparent to those skilled in the art from a review of the following detailed description, taken in conjunction with the drawings and appended claims.

DETAILED DESCRIPTION OF THE INVENTION

Figure 1:
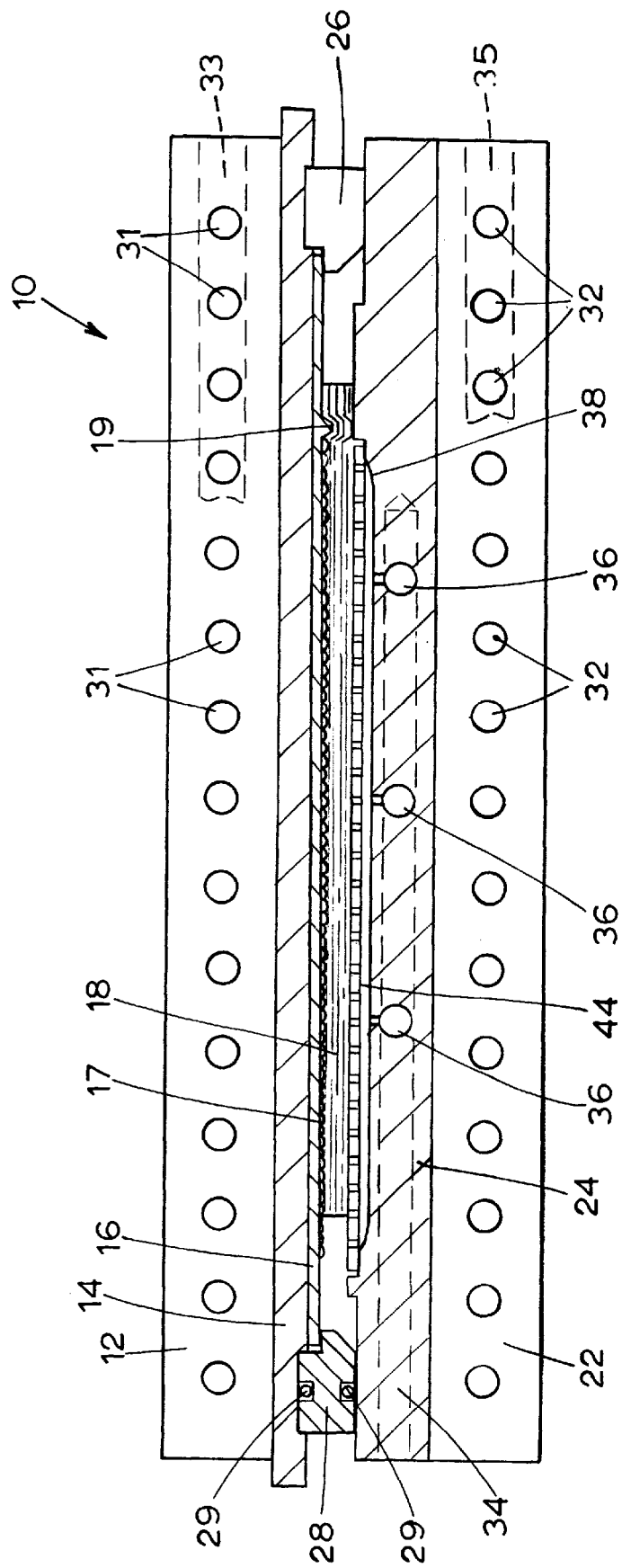
FIG. 1 is a widthwise cross-sectional view of the steam injection pressing apparatus of the present invention wherein the left-hand side of the drawing illustrates a "cavity pressing" press seal and the right-hand side of the drawing illustrates a "dam pressing" press seal.

According to the invention, a consolidated cellulosic article is made by combining a resin binder and a cellulosic material, such as cellulosic fibers or cellulosic particles. A mat is formed, and the mat is consolidated under heat, steam, and pressure in a pressing apparatus. A precipitating agent, preferably an acid as described in greater detail below, optionally may be provided to the resin and/or cellulosic material, preferably prior to the mat consolidation stage.

According to one method of the present invention, a phenolic resin is combined with cellulosic material to form a mixture, optionally followed by providing an acid compound to the mixture. The acid compound may be sprayed onto the phenolic resin/cellulosic mixture by known expedients. The method further includes the steps of forming a mat from the cellulosic material/resin binder mixture on a support member and introducing the mat into a pressing apparatus. The mat is consolidated under heat, steam, and pressure in the pressing apparatus to form a consolidated, integral article.

In another optional embodiment of the inventive method, an acid compound is initially combined with a cellulosic material to form a mixture, followed by providing a phenolic resin to the mixture. The phenolic resin may be sprayed onto the cellulosic/acid mixture. This method also includes the additional steps of forming a mat from the acid compound-containing mixture on a support member and introducing the mat into a pressing apparatus. The acid compound-containing mat is consolidated under heat, steam, and pressure in the pressing apparatus to form a consolidated, integral article.

The cellulosic filler used with the invention is preferably cellulosic fiber or cellulosic particles (e.g., chips, strands or flakes).

Preferred resins for use in accordance with the invention include phenolic resins, including modified phenolic resins. While the phenolic resin may be in a powdered, high molecular weight form, the powdered form typically is more expensive to manufacture and, therefore, an aqueous form of the resin is preferred.

Many suitable phenolic resins are available commercially. Generally, a phenolic resin is a reaction product of a phenolic component and an aldehyde, the reaction occurring in the presence of an alkaline compound. The phenolic component of the phenolic resin for use in accordance with the invention may include phenol, cresol, xylenols, other substituted phenols, and/or mixtures thereof. Examples of substituted phenols include o-cresol, p-cresol, p-tertbutylphenol, p-nonylphenol, p-dodecylphenol, and bi-functional xylenols (e.g., 3,5-xylenols). A mixture of cresols, phenol, and xylenols (commonly known as cresylic acid) may be useful in accordance with a commercial scale practice of the inventive method due to its abundance and relatively low cost.

The aldehyde component of the phenolic resin for use in accordance with the invention is not limited to aldehyde itself, but encompasses any aldehyde, formaldehyde, and derivatives thereof which are known in the art to be useful in conjunction with the manufacture of phenolic resins. Thus, references herein to the aldehyde component of the resin include aldehydes, formaldehydes, and derivatives thereof. Formaldehyde is the preferred aldehyde. Derivatives of formaldehyde include, for example, para-formaldehyde, hexamethylenetetramine, acetaldehyde, glyoxal, and formaldehyde.

The ratio of the aldehyde component to the phenolic component may be in a range of about 2.0 moles aldehyde or less per mole of phenolic component, more specifically about 0.5 moles to about 1.2 moles aldehyde per mole of phenolic component, for example, about 0.8 moles to about 1.0 moles aldehyde per mole of phenolic component. If a bi-functional phenolic compound is used (e.g., 3,5-xylenols), the equivalent molar ratio (i.e., the ratio of moles of aldehyde to the number of free positions on the phenolic ring available for reaction with the aldehyde) can be in a range of about 0.4:1 to about 0.66:1.

As noted above, formation of the phenolic resin for use in accordance with the invention preferably occurs in the presence of an alkaline compound (sometimes referred to as "caustic") that is used: (a) to achieve methylolation of the phenol; (b) to speed the reaction between the aldehyde and phenolic compound; and, (c) to solubilize the formed resin. Various suitable alkaline compounds are known in the art, and include, for example, sodium hydroxide, potassium hydroxide, or mixtures thereof Although higher proportions of caustic may be used and those skilled in the art will be able to select suitable caustic levels, the amount of caustic added to the phenolic/aldehyde mixture may be in a range of about 0.05 moles to about 0.2 moles of alkaline compound per mole of phenolic compound. Such an amount of caustic generally assures very beneficial properties of the formed product while allowing for a sufficiently rapid resin cure.

Optionally, an amount of dihydroxybenzene modifier (e.g., resorcinol) may be added to the phenolic resin. Examples of dihydroxybenzenes include resorcinol, hydroquinone, and catechol. Unsubstituted and substituted resorcinols including mixtures thereof, also may be used. The reaction between the phenolic resin and the modifier preferably occurs without the further addition of caustic, until a desired chain length is reached to produce a modified phenolic resin. Though resorcinol is the preferred modifier compound, other modifier compounds that may be reacted with a phenol-formaldehyde resin include aminophenols and phenylenediamines. Examples of aminophenols include ortho-hydroxyaniline, meta-hydroxyaniline, and para-hydroxyaniline. Examples of phenylenediamines include ortho-phenylenediamine, meta-phenylenediamine, and para-phenylenediamine. When included, the modifier compound is preferably present in a range of about one mole to about ten moles of the phenol compound per mole of resorcinol, and preferably about five moles to about ten moles phenol per mole of resorcinol. The molar ratio of aldehyde to total phenolics (i.e., the phenolic components plus dihydroxybenzene modifier) is preferably greater than about 1:1, more preferably is in a range of about one mole to about 1.8 moles formaldehyde per mole of phenolics, and most preferably about 1.1 moles to about 1.4 moles formaldehyde per mole phenolics.

According to the invention, once a mat comprising a resin binder, preferably a phenolic resin binder, and cellulosic material, has been formed, the mat is introduced into a suitable pressing apparatus preferably having multiple press openings for consolidation of a plurality of products simultaneously, via a caulless loader, as well known in the art.

Each of the press openings will include a steam injection platen and a slotted steam distribution plate over the lower press heating platen to provide a means for steam transport into and out of the mat. Steam supply and exhaust to each steam injection platen will be through a steam supply and exhaust assembly that includes a manifold connected to each steam injection platen via link pipes fitted with swivel joints. The entire steam supply and exhaust assembly is mounted to an upper surface of each lower press heating platen fitted with a separate steam supply for heating the press heating platens.

The upper pressing surface of the press opening is fitted with a stop frame or stop-bars and a product-contacting surface plate that is attached to a carrier plate mounted to a lower surface of the upper press heating platen. The product-contacting surface plate may be either embossed or smooth, depending on the desired product surface.

Figure 2:
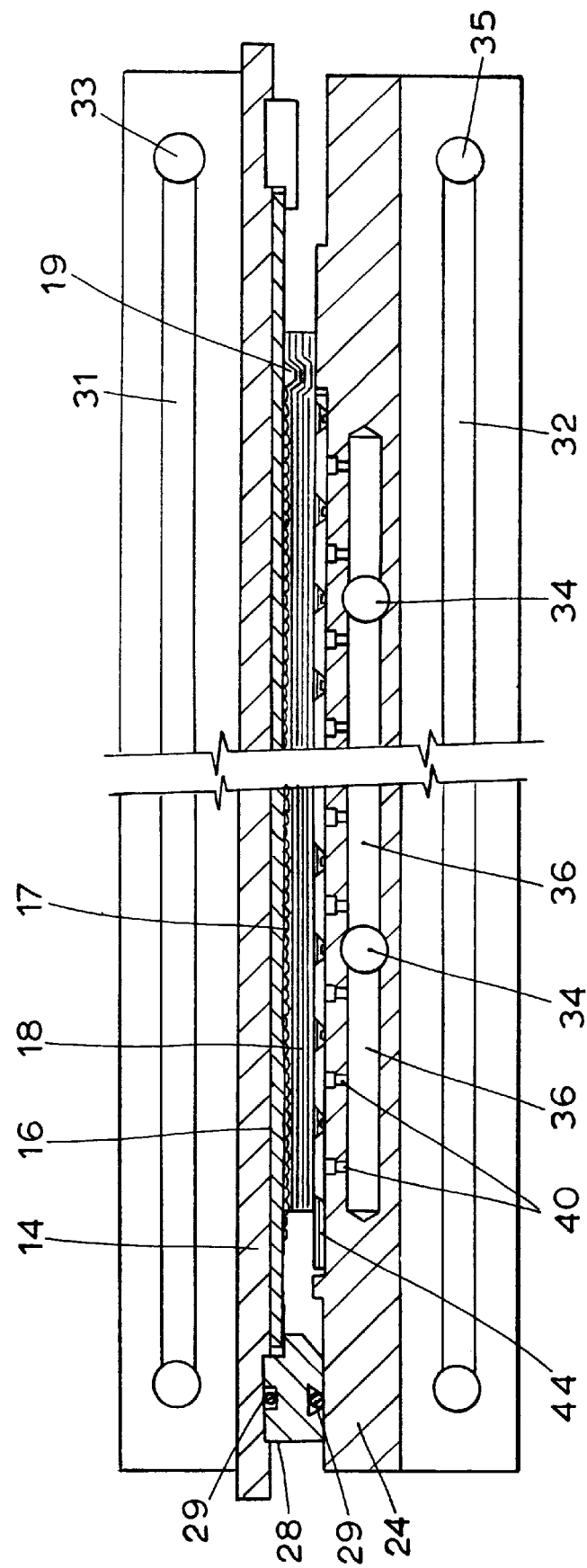
FIG. 2 is a lengthwise cross-sectional view of the steam injection pressing apparatus of the present invention wherein the left-hand side of the drawing illustrates a "cavity pressing" press seal and the right-hand side of the drawing illustrates a "dam pressing" press seal.

The injected steam can be confined to the mat via the stop frame, attached to the carrier plate, which completely encircles the mat to form an autoclave within the press opening (cavity pressing) as shown in the left portion of FIGS. 1 and 2. The entire mat will receive full treatment of the injected steam. Steam pressure seals are achieved with elastic, e.g., rubber, sealing members mounted to the stop frame. Final product caliper control is achieved via the stop frame thickness.

Alternatively, the injected steam can be confined to the mat via an elevated rib or dam preferably formed integral with the surface plate (dam pressing) as shown in the right portion of FIGS. 1 and 2. The elevated dam is of a dimension calculated to densify the mat around its entire periphery to form a steam-confining closure within the dammed area when the press is fully closed. Only the mat within the dammed area will receive full treatment of the injected steam. The densified perimeter of the mat compressed by the dams will form a seal that cannot be penetrated by lateral flow of the injected steam therethrough. In this arrangement, product final caliper is determined by the stop bar thickness which is attached to the long sides only of the carrier plate.

The stop frame method of confining steam to the mat may be referred to as "cavity pressing" and the perimeter dam method as "dam pressing". There are advantages and disadvantages of each method, but both methods provide effective seals for the containment of injected steam within the mat.

After the mat is disposed within each press opening, via the caulless loader, the press is closed to its final position as determined by the stop frame or stop bar thickness. The mat is compressed to its final thickness by closing the press prior to steam injection. During closing of the press and compression of the mat, the mat cavity is open to the atmosphere so that air can be exhausted from the mat and press cavity to the atmosphere via the slotted steam distribution plate and steam injection platen, the link pipe and manifold apparatus, and an exhaust valve included in the steam injection piping.

Once the press is closed to its final position and the press hydraulic pressure has increased to a level whereby the press closing force exceeds, by a sufficient safety factor, the opposing forces exerted by mat compression and the maximum injected cavity steam pressure, the steam injection is initiated.

Preferred press cavity steam pressures, depending on product thickness and end use, may vary in the range of about 100 to about 300 psig, corresponding to saturated steam temperatures of about 335° F. to about 425° F. Preferred press heating platen steam pressure is nominally in the range of about 400 to about 500 psig, corresponding to saturated steam temperatures of about 450° F. to about 475° F., and is continuously held constant.

After the steam is injected into the mat and the time period for resin cure has elapsed, the injection steam supply valve is closed and pressure can be slowly reduced via a pressure-reducing valve to a predetermined level for subsequent opening of the steam exhaust valve. The exhaust valve capacity far exceeds that of the pressure reducing valve. The pressure reducing valve, with a back pressure controller, may also be used for limiting the peak steam pressure within the cavity which may occur due to the heat transfer via conduction from the press heating platens.

Prior to opening of the press, the cavity steam pressure preferably is reduced to less than about 5 psig, more preferably less than about 3 psig. Depressurization of the cavity, generally speaking, requires about twice as long as pressurization. Once the cavity pressure is reduced to an acceptable level, the press may be opened for loading of the next mat or mats.

For the pressing of mats into products of specific gravities in the range of about 0.60 to about 0.90 and product calipers of about 0.50 to about 1.0 inch, total press times (including loading the mat, pressing, and unloading the mat) in the range of about 3 to 5 minutes are achievable in accordance with the steam injection method of the present invention, which are quite unexpected when compared to press times for the conventional pressing methods for dry or wet process products without steam injection, whereby heat transfer is via conduction from the heating platens only.

Process parameters and apparatus for steam injection pressing are described more fully in K. Walter, *Steam Pressing Experience from Operating Plants and Future Possibilities*, (G. Siempelkamp GmbH and Co.) and in U.S. Pat. Nos. 5,195,428; 5,134,023; and 4,850,849, the respective disclosures of which are incorporated herein by reference.

Quite surprisingly and unexpectedly, it has been found that the invention provides excellent cellulosic composite articles by steam injection pressing a mat including cellulosic material and a binder resin, such as a phenol formaldehyde resin.

Turning now to the drawings, and initially to FIGS. 1 and 2, there is illustrated a new and improved pressing apparatus 10 for steam injection during consolidation of cellulosic material and a resin binder in a heated press in accordance with the methods and apparatus of the present invention. As shown in FIG. 1, the pressing apparatus includes an upper press heating platen 12 that includes a carrier plate 14, carrying a contoured embossing plate 16 that contacts an upper major surface 17 of the consolidated cellulosic product 18, for providing the upper major surface 17 with an embossed design; a lower press heating platen 22 in contact with a steam injection platen 24 (or integral therewith) for dam pressing; a pair of platen press stops 26 (only one being illustrated on the right-hand side of FIG. 1); or for cavity pressing a stop frame 28 that carries elastomeric seals 29 (left-hand side of FIG. 1) that extends around the periphery of the carrier plate 14 and steam injection platen 24 to create a steam-entrapping seal therebetween. An elevated rib or dam 19 (right hand side of FIGS. 1 and 2) around the entire periphery of and formed integral with the embossing plate 16 will create a steam-entrapping seal for dam pressing by densifying an area of the product 18 around its entire periphery. Upper and lower press heating platens 12 and 22 include steam channels 31 and 32, respectively, in fluid communication with steam inlet channels 33 and 35, respectively, for heating the upper and lower press heating platens 12 and 22. The press heating platens 12 and 22 conduct heat through the carrier plate 14 and embossing plate 16 (upper portion of press) and through the steam injection platen 24 and a steam distribution plate 44 (lower portion of press) to the mat 18.

Figure 3:
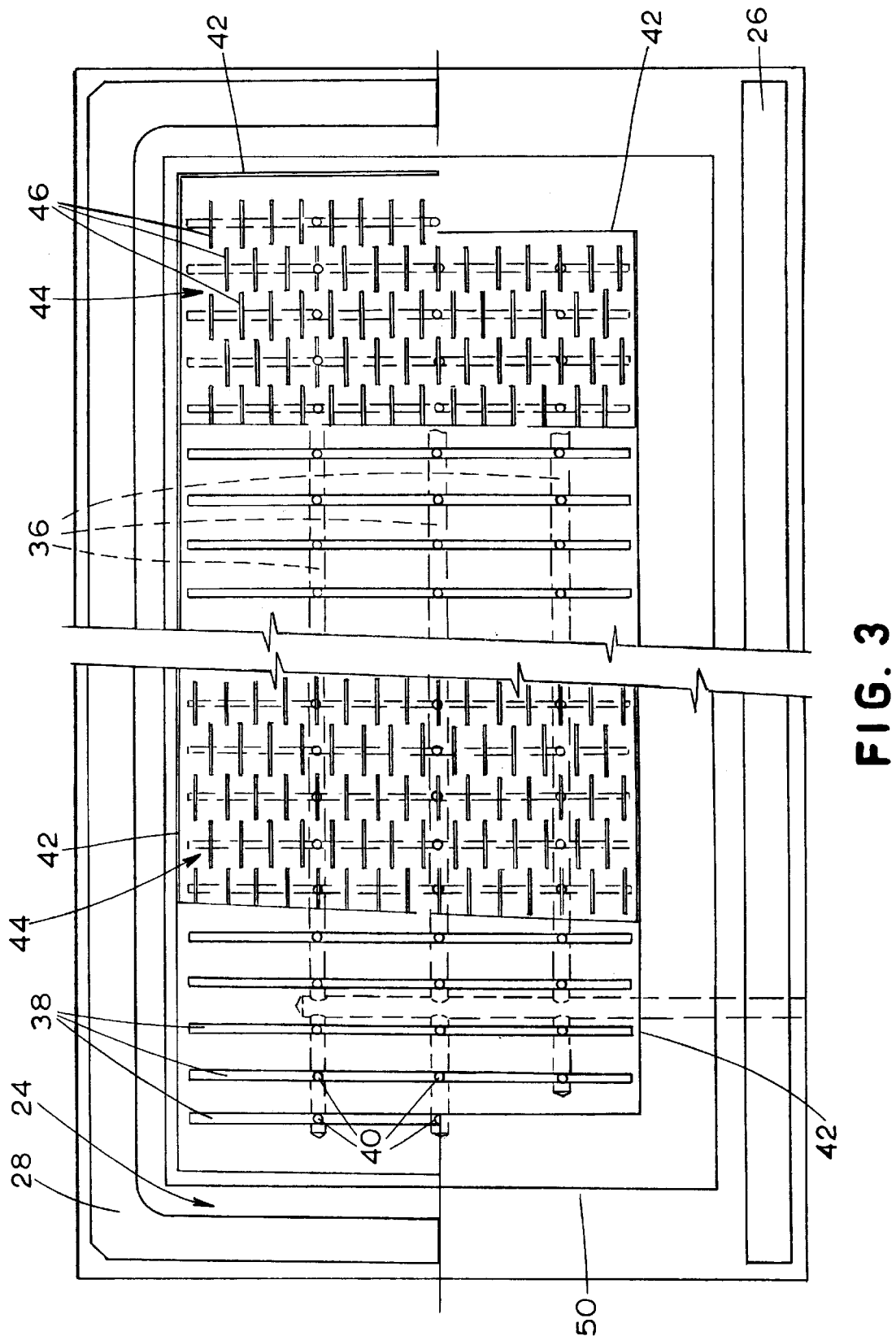
FIG. 3 is a partially broken-away top view of the lower heating press platen, steam injection platen and steam distribution plate portions of the steam injection apparatus of the present invention showing the steam injection platen and an overlying steam distribution plate showing, in broken lines, the steam distribution channels formed within an upper surface of the steam injection platen, wherein an upper portion of the drawing illustrates a "cavity pressing" press seal and a lower portion of the drawing illustrates a "dam pressing" press seal.

The steam injection platen 24 includes a plurality of internal steam inlet/outlet conduits 34, fluid-interconnected to longitudinal steam injection platen conduits 36, disposed internally within the steam injection platen 24, for distributing steam lengthwise or longitudinally to a plurality of widthwise or transverse steam injection channels 38, that are open at the upper surface of the steam injection platen 24. As best shown in FIG. 3, the steam injection platen conduits 36 lead to and are formed integral, and in fluid communication, with a plurality of parallel, fluid-interconnected steam injection platen channels or openings 38. The steam injection platen channels 38 are disposed across the width of the steam injection platen 24 to provide steam flow throughout the upper surface of the steam injection platen 24 over an area essentially coextensive with the area of a lower major surface of the slotted steam distribution plate 44. Longitudinal steam injection platen conduits 36 are fluid-interconnected to the steam injection channels 38 extending widthwise at the upper surface of the steam injection platen 24 through a series of connecting ports 40 disposed to intersect and provide fluid-communication between the steam injection platen conduits 36 and the steam injection platen channels 38.

As best shown in FIG. 3, the upper surface 50 of the steam injection platen 24, including the open steam injection platen channels 38, is formed to include a depression 42 for receiving and positioning a slotted steam distribution plate, generally designated by reference numeral 44. Steam distribution plate 44 is formed to include spaced, parallel slots 46 that extend completely through the distribution plate 44, shown in FIG. 3 disposed in position within the depression 42 in the steam injection platen 24. The steam distribution plate slots 46 are in fluid communication with the steam injection platen channels 38 for distribution of steam to an entire upper surface of the slotted steam distribution plate 44. It should be understood that steam distribution plate slots 46 are shown in FIG. 3 to be formed longitudinally, at a 90° angle, with respect to the transversely formed steam injection platen channels 38, but could be formed at other angles with respect to the steam injection platen channels 38. To achieve the full advantage of the present invention, the platen steam injection channels 38 have a width of about 5 mm to about 20 mm, preferably about 10 mm.

In accordance with an important feature of the present invention, the slots 46 in steam distribution plate 44 intersect the steam injection platen channels 38 at an angle (distribution plate slots 46 are not in alignment with steam injection platen channels 38), preferably at a 90° angle, as shown. To achieve the full advantage of the present invention, the slots 46 in the steam distribution plate 44 have a width of about 0.2 mm to 1.0 mm, preferably about 0.5 mm to about 0.9 mm, and have a length of more or less the same as the longitudinal spacing of the steam injection platen channels 38, e.g., about 90 mm, and preferably are about 50 mm to about 150 mm long. In the preferred embodiment, steam distribution plate slots 46 are 0.7 mm wide and 90 mm long and are spaced about 7 mm to about 15 mm, preferably about 11 mm, in a plurality of parallel, offset rows, as shown in FIG. 3.

Quite unexpectedly, the intersecting distribution plate slots 46, intersecting the steam injection platen channels 38, provide an even and penetrating supply of steam over the entire undersurface 48 of the mat 16 being consolidated, and provides homogeneous and complete distribution of steam throughout the mat being consolidated, and do not entrap enough cellulosic material to create a problem in removing the finished, consolidated cellulosic product from the heated press 10.

It has been found that the slots 46 in the steam distribution plate 44 should provide at least 6% open area, preferably about 8% to about 10% open area, at the undersurface of the mat 16 in order to provide sufficient steam to the cellulosic material and binder. Otherwise, the dimensions of, and the angles of intersection between steam distribution plate slots 46 and steam injection platen channels 38 can vary widely while achieving the advantages of the present invention.

The foregoing description is given for clearness of understanding only, and no unnecessary limitations should be understood therefrom, as modifications within the scope of the invention may be apparent to those skilled in the art.

What is claimed is:

1. A method of making a cellulosic composite article, the method comprising the steps of:
    (a) combining a resin binder with cellulosic material to form a mixture;
    (b) forming a mat from the mixture of step (a);
    (c) consolidating the mat under steam, and pressure in a pressing apparatus including a pair of heated platens including a steam injection platen that includes a plurality of openings for the passage of steam therethrough;
    (d) providing a slotted steam distribution plate adjacent to said steam injection platen and in contact with said mixture, said slotted steam distribution plate having slots that intersect the openings in the slotted steam injection platen, said slots in said steam distribution plate providing a steam injection open area comprising at least 6% of a major adjacent surface of said composite article;
    (e) injecting steam through the openings in said slotted steam injection platen and through the slots in the steam distribution plate to achieve complete contact of said mixture with said steam to consolidate said mixture into a cellulosic article having structural integrity and to cure said resin binder; and
    (f) discharging said steam from a steam injection-side of said pressing apparatus.

2. The method of claim 1, wherein the resin binder comprises a phenolic resin.

3. The method of claim 2, wherein the phenolic resin comprises a reaction product of a phenolic compound and an aldehyde, the phenolic compound selected from the group consisting of phenols, cresols, substituted phenols, and mixtures thereof, and the aldehyde selected from the group consisting of formaldehyde, para-formaldehyde, acetaldehyde, furfuraldehyde, and glyoxal.

4. The method of claim 3, wherein the phenolic resin comprises phenol-formaldehyde.

5. The method of claim 1, wherein the slots in the steam distribution plate have a width of 0.2 to 1.0 mm and a length at least 50 mm.

6. The method of claim 5, wherein the width of the slots in the steam distribution plate is about 0.5 to about 0.9 mm.

7. The method of claim 6, wherein the slots in the steam distribution plate are about 0.7 mm in width and at least 50 mm in length, and are spaced about 7 to about 15 mm.

8. A method of making a cellulosic composite article, the method comprising the steps of:
    (a) combining a phenolic resin with cellulosic material to form a mixture;
    (b) forming a mat from the mixture of step (a);
    (c) consolidating the mat under heat, steam, and pressure in a pressing apparatus to form the article; and,
    (d) distributing steam to the mat, while applying heat and pressure to the mat during consolidation thereof, through openings in a steam injection platen and intersecting slots in an adjacent steam distribution plate, said slots having a width of less than 1 mm and providing at least 6% open area, with respect to the area of a mat major surface adjacent the steam distribution plate.

9. Apparatus for injecting steam into a mat containing cellulosic material and a resin binder for the cellulosic material comprising:
    (a) a press comprising opposed heated platens, including a steam injection platen containing a plurality of steam-receiving passages therein, said steam injection platen having a plurality of openings in its upper surface, in fluid communication with one or more of said steam-receiving passages, for the flow of steam therethrough;
    (b) a steam distribution plate disposed over the openings in the steam injection platen, said steam distribution plate including a plurality of slots extending completely through a thickness thereof, said slots in said steam distribution plate disposed to intersect the openings in the steam injection platen for receiving steam from said steam injection platen for flow of said steam through the steam distribution plate to a major surface of said mat; and
    (c) said slots in said steam distribution plate providing at least 6% open area adjacent the mat.

10. The apparatus of claim 9, wherein the slots in the slotted plate have a width of 0.2 to 1.0 mm and a length at least 50 mm.

11. The apparatus of claim 10, wherein the width of the slots in the steam distribution plate is about 0.5 to about 0.9 mm.

12. The apparatus of claim 11, wherein the slots in the steam distribution plate are about 0.7 mm in width and at least 50 mm in length, and are spaced about 7 to about 15 mm.

* * * * *